United States Patent Office 3,396,089
Patented Aug. 6, 1968

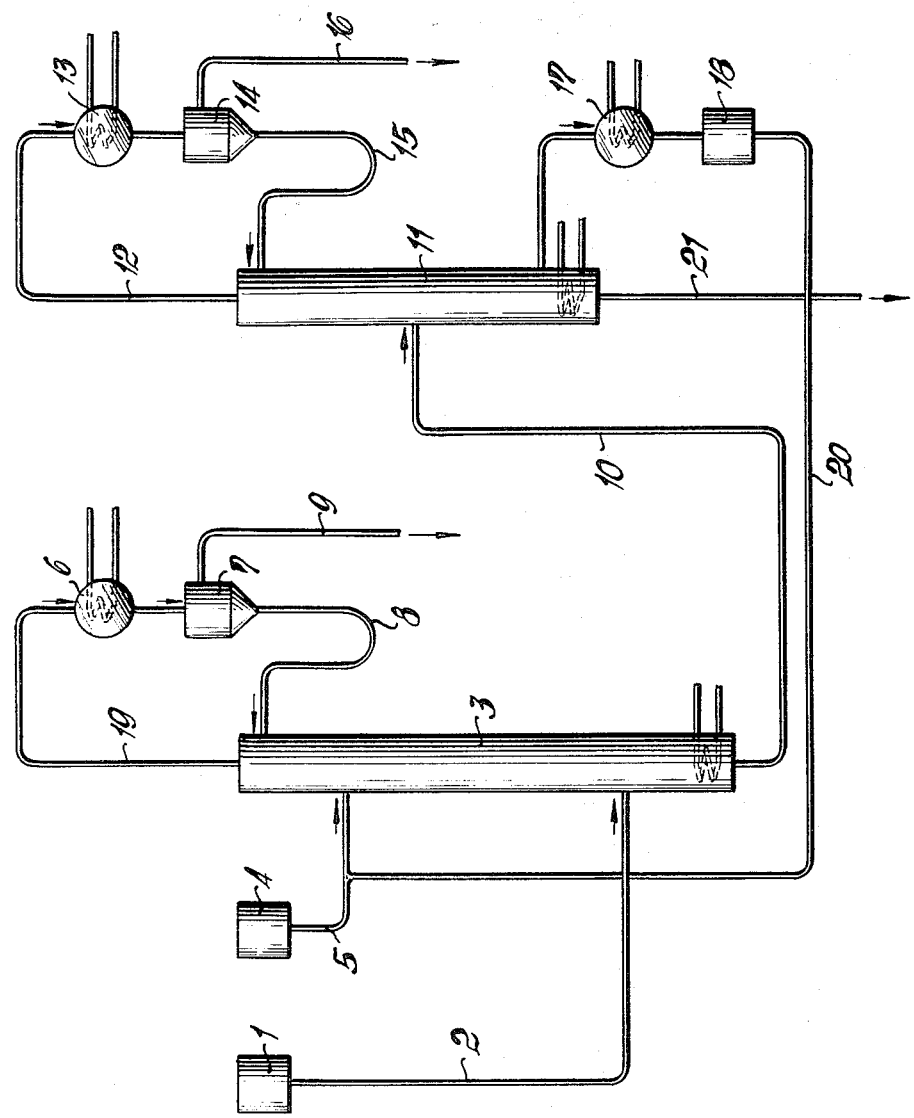

3,396,089
PROCESS FOR SEPARATING 2-CHLORO-
BUTADIENE - (1,3) FROM TRANS - 2-
CHLOROBUTENE-(2)
Kurt Sennewald, Knapsack, near Cologne, Heinz Erpenbach, Surth, near Cologne, Wilhelm Vogt, Knapsack, near Cologne, and Herbert Joest, Cologne-Sulz, Germany, assignors to Knapsack Aktiengesellschaft, Knapsack, near Cologne, Germany, a corporation of Germany
Filed Dec. 27, 1966, Ser. No. 604,681
Claims priority, application Germany, Jan. 19, 1966, K 58,175, Patent 1,249,254
5 Claims. (Cl. 203—70)

ABSTRACT OF THE DISCLOSURE

2 - chlorobutadiene - (1,3) contaminated with trans-2-chlorobutene-(2) is purified by vaporizing the contaminated 2-chlorobutadiene-(1,3) and scrubbing the vaporized matter with at least 5 times the amount by volume of liquid n-heptane or iso-octane, referred to the liquid volume of the contaminated 2-chlorobutadiene-(1,3), to remove the trans-2-chlorobutene-(2).

The present invention relates to a process for the purification of 2-chlorobutadiene-(1,3) contaminated with trans-2-chlorobutene-(2).

British Patent 944,084 describes a process for the manufacture of 2-chlorobutadiene-(1,3), wherein specific dichlorobutenes are subjected to thermal splitting with the resultant formation of reaction mixtures which, in addition to 2-chlorobutadiene-(1,3) and unreacted starting material, contain relatively small proportions of unsaturated chlorinated hydorcarbons, inter alia trans-2-chlorobutene-(2). 2-chlorobutadiene-(1,3) is customarily isolated from those mixtures by fractional distallation, and 2-chlorobutadiene-(1,3) (boiling point: 59.4° C.) and trans-2-chlorobutene-(2) (boiling point: 62.84° C.) are collected jointly as a homogeneous fraction, due to the slight difference in the boiling points of about 3° C. of these two compounds. The distillative separation of this binary mixture with the object of recovering 2-chlorobutadiene-(1,3) is a commercially unattractive procedure, but no further purification methods have been described heretofore.

The present invention now provides a technically simple process for the purification of 2-chlorobutadiene-(1,3) contaminated with trans-2-chlorobutene-(2) by extractive distillation by means of n-heptane with the resultant formation of 2-chlorobutadiene-(1,3) having a purity, for example, of 99.95%, which enables the 2-chlorobutadiene-(1,3) to be used for polymerization.

In accordance with the present invention, contaminated 2-chlorobutadiene-(1,3) in vapor form is freed from trans-2-chlorobutene-(2) by scrubbing the vaporized matter in counter-current manner, in a column, with at least 5 times the amount by volume of liquid n-heptane, referred to the liquid volume of the contaminated 2-chlorobutadiene-(1,3). Pure 2-chlorobutadiene-(1,3) is obtained at the head of the column and trans-2-chlorobutene-(2) dissolved in the n-heptane (boiling point: 98.4° C.) is withdrawn in vapor form in a second column and liquefied by cooling it. The n-heptane used as the scrubbing agent can be replaced with iso-octane which has a boiling point (99.2° C.) slightly higher than that of n-heptane.

5 to 15 times the amount by volume of n-heptane or iso-octane, referred to the liquid volume of the 2-chlorobutadiene-(1,3), is preferably used for scrubbing the above mixture in vapor form and freeing it from trans-2-chlorobutene-(2).

The 2-chlorobutadiene-(1,3) can be purified in continuous manner. To this end, the n-heptane or iso-octane recovered in the bottom portion of the second column, after separation of trans-2-chlorobutene-(2), is continuously recycled to the first column to be used again for scrubbing contaminated 2-chlorobutadiene-(1,3).

The crude 2-chlorobutadiene-(1,3) to be purified generally contains trans-2-chlorobutene-(2) in a proportion of up to 5% by weight; when purified, it has a purity of more than 99.9%.

In addition to trans-2-chlorobutene-(2), the crude 2-chlorobutadiene - (1,3) contains cis - 2 - chlorobutene-(2) and 1-chlorobutadiene-(1,3) which have a boiling point higher than that of trans-2-chlorobutene-(2). These are also absorbed in the present process by the n-heptane or iso-octane, withdrawn in vapor form at the head of the second column and liquefied by cooling.

An exemplary mode of carrying out the present process in continuous fashion is shown diagrammatically in the annexed flow scheme.

As shown therein, 2-chlorobutadiene-(1,3) contaminated with trans-2-chlorobutene-(2) is caused to flow from reservoir 1 through conduit 2 into the lower portion of a packed and heated distilling column 3 to be vaporized therein. The vaporized matter ascending in column 3 is scrubbed in counter-current manner with at least 5 times the amount by volume, referred to the liquid volume of 2-chlorobutadiene-(1,3), of n-heptane or isooctane coming from container 4 and travelling through conduit 5 or 20 into the upper portion of column 3, a solution of trans-2-chlorobutene-(2) in n-heptane or isooctane being obtained in the sump of column 3. 2-chlorobutadiene-(1,3) with a purity of more than 99.9% is removed at the head of column 3 through line 19, liquefied in cooler 6 and collected in separator 7. A portion of the 2-chlorobutadiene-(1,3) obtained in separator 7 is refluxed through line 8 to column 3, the remaining portion being withdrawn through line 9. The sump product of column 3 is conveyed through conduit 10 to fractionating column 11 in which trans-2-chlorobutene-(2) is distilled. At the head of column 11, trans-2-chlorobutene-(2) is withdrawn through line 12, liquefied in cooler 13 and collected in separator 14. A portion of the condensed matter obtained in separator 14 is refluxed through line 15 to column 11, the balance portion of the trans-2-chlorobutene-(2) being withdrawn through discharge line 16. n-Heptane or isooctane withdrawn from the lowermost tray of column 11 is liquefied in condenser 17, collected in container 18 and returned through cycle line 20 to column 3 to be used again. Polymerization and dimerization products of 2-chlorobutadiene-(1,3), if any, can be removed from the sump of column 11 by means of line 21.

The stabilization of 2-chlorobutadiene-(1,3) by means of a polymerization inhibitor is a feature of considerable significance. In the present case, a combination formed of N-nitrosodiphenylamine and tertiary butyl-pyrocatechol should conveniently be used as the polymerization inhibitor. Both the crude 2-chlorobutadiene-(1,3) and the material refluxed through lines 8 and 15, respectively, are stabilized by the addition of 0.3 part per thousand of N-nitrosodiphenylamine and 0.1 part per thousand of tertiary butyl-pyrocatechol, referred to the 2-chlorobutadiene-(1,3) contained in the material to be stabilized.

The present invention relates more particularly to a process for the purification of 2-chlorobutadiene-(1,3) contaminated with trans-2-chlorobutene-(2), which comprises vaporizing the contaminated 2-chlorobutadiene-(1,3) and thereafter freeing the vaporized matter from trans-2-chlorobutene-(2) by scrubbing it with at least 5 times the amount by volume of liquid n-heptane or iso-octane, referred to the liquid volume of the contaminated 2-chlorobutadiene-(1,3). A preferred feature of the present invention comprises continuously vaporizing, in a first distilling stage, the contaminated 2-chlorobutadiene-(1,3), stabilized by means of a polymerization inhibitor, scrubbing the vaporized matter with 5 to 15 times the amount by volume, referred to the liquid volume of the contaminated 2-chlorobutadiene-(1,3), of liquid n-heptane or iso-octane, which has a temperature of 20 to 70° C., is introduced from above into the distilling stage and flows counter-currently with respect to the vaporized matter, distilling off 2-chlorobutadiene-(1,3) with a purity of more than 99.9% at the head of the first distilling stage, withdrawing contaminated n-heptane or iso-octane at the bottom of the first distilling stage and recycling it approximately to the center portion of a second distilling stage, distilling off at the head of said second distilling stage a mixture formed of trans-2-chlorobutene-(2) and 2-chlorobutadiene-(1,3), withdrawing n-heptane or iso-octane above the sump of the said second distilling stage, cooling the scrubbing agent and continuously recycling it to the upper portion of the first distilling stage, and withdrawing polymeric contaminants from the sump of the second distilling stage.

A portion of the condensed matter recovered at the head of the first and second distilling stages, respectively, can be branched off and, after stabilization by means of a polymerization inhibitor, refluxed to the head of the same distilling stage. 0.3 part per thousand of N-nitrosodiphenylamine and 0.1 part per thousand of tertiary butyl-pyrocatechol is preferably used as the polymerization inhibitor, referred to the total quantity of the 2-chlorobutadiene-(1,3) to be stabilized in each particular case. The 2-chlorobutadiene-(1,3) to be purified may be contaminated with up to 5% by weight trans-2-chlorobutene-(2).

Example 1

250 grams/hr. (about 261 cc.) of a mixture formed of 95% by weight 2-chlorobutadiene-(1,3) and 5% by weight trans-2-chlorobutene-(2), which had been stabilized with 0.3 part per thousand of N-nitrosodiphenylamine and 0.1 part per thousand of tertiary butyl-pyrocatechol, were introduced, 1 meter above the bottom, into column 3 which was 6 meters high and packed with refined steel spirals, and vaporized therein at a temperature of 100° C. in the still of the column. The vapor mixture flowing upwardly in the column was scrubbed, per hour, with 3500 cc. n-heptane supplied to column 3, 5 meters above its bottom. 2-chlorobutadiene-(1,3) in vapor form, which contained no more than 0.1% by weight trans-2-chlorobutene-(2) and had a temperature of 59° C., was removed at the head of column 3, liquefied subsequently and collected in separator 7. At least 2 of 3 parts distilled 2-chlorobutadiene-(1,3) were refluxed to column 3, after stabilization. A total of 225 grams (about 235 cc.) 2-chlorobutadiene-(1,3) was withdrawn, per hour, through line 9.

The 2-chlorobutadiene-(1,3) had a purity of more than 99.9%; distilled 2-chlorobutadiene-(1,3) was obtained in a yield of 95%.

n-Heptane contaminated with trans-2-chlorobutene-(2), obtained in the sump of column 3, was caused to flow to the center portion of column 11 packed with refined steel spirals and 3 meters high, in which trans-2-chlorobutene-(2) was separated by subjecting the n-heptane to fractional distillation at a temperature of 105° C. in the still of the column. To improve the separation efficiency, at least 5 of 6 parts distilled impure trans-2-chlorobutene-(2) leaving at the head of column 11 at a temperature of 61° C., were refluxed to that column, after stabilization. A total of 19 grams trans-2-chlorobutene-(2) contaminated with 30% by weight 2-chlorobutadiene-(1,3) were withdrawn from separator 14 through line 16.

n-Heptane removed as the vapor phase above the sump of column 11 was cooled down to a temperature of 70° C. and recycled through cycle line 20 to column 3. 20 grams of a sump product, formed of 14 grams n-heptane and 6 grams polymeric 2-chlorobutadiene-(1,3), were simultaneously withdrawn from the still of column 11.

Example 2

250 grams/hr. of a mixture formed of 96.8% by weight 2-chlorobutadiene-(1,3), 1.6% by weight trans-2-chlorobutene-(2), 0.4% by weight cis-2-chlorobutene-(2), and 1.2% by weight 1-chlorobutadiene-(1,3) were extracted by means of n-heptane in the manner set forth in Example 1.

230 grams 2-chlorobutadiene-(1,3), corresponding to a yield of 95%, which had a purity of more than 99.9% were obtained as the head product of column 3.

The head product of column 11 consisted of 14 grams distilled matter, formed of 6 grams 2-chlorobutadiene-(1,3), 4 grams trans-2-chlorobutene-(2), 1 gram cis-2-chlorobutene-(2), and 3 grams 1-chlorobutadiene-(1,3).

20 grams sump product, formed of 14 grams n-heptane and 6 grams polymeric 2-chlorobutadiene-(1,3), were simultaneously withdrawn from the still of column 11.

We claim:
1. A process for the purification of 2-chlorobutadiene-(1,3) contaminated with trans-2-chlorobutene-(2), which comprises vaporizing the contaminated 2-chlorobutadiene-(1,3) and thereafter freeing the vaporized matter from trans-2-chlorobutene-(2) by scrubbing the said vaporized matter with at least 5 times the amount by volume of a member selected from the group consisting of liquid n-heptane and liquid iso-octane, referred to the liquid volume of the contaminated 2-chlorobutadiene-(1,3).

2. The process of claim 1, which comprises continuously vaporizing, in a first distilling stage, the contaminated 2-chlorobutadiene-(1,3), stabilized by means of a polymerization inhibitor, scrubbing the vaporized matter with 5 to 15 times the amount by volume, referred to the liquid volume of the contaminated 2-chlorobutadiene-(1,3), of a liquid scrubbing agent, formed of a member selected from the group consisting of n-heptane and iso-octane, which has a temperature of 20 to 70° C., is introduced from above into the distilling stage and flows countercurrently with respect to the vaporized matter, distilling off 2-chlorobutadiene-(1,3) with a purity of more than 99.9% as the head product of the first distilling stage, withdrawing contaminated scrubbing agent as the bottom product of the first distilling stage and recycling the said bottom product approximately to the center portion of a second distilling stage, distilling off, as the head product of said second distilling stage, a mixture formed of trans-2-chlorobutene-(2) and 2-chlorobutadiene-(1,3), withdrawing scrubbing agent above the sump of the said second distilling stage, cooling the scrubbing agent and continuously recycling it to the upper portion of the first distilling stage, and withdrawing polymeric contaminants as the sump product of the second distilling stage.

3. The process of claim 2, wherein a portion of the condensed matter recovered at the head of the first and second distilling stages, respectively, is branched off and, after stabilization by means of a polymerization inhibitor, is refluxed to the head of the same distilling stage.

4. The process of claim 2, wherein about 0.3 part per thousand of N-nitrosodiphenylamine and 0.1 part per thousand of tertiary butyl-pyrocatechol, referred to the total quantity of 2-chlorobutadiene-(1,3) to be stabilized in each particular case, is used as the polymerization inhibitor.

5. The process of claim 1, wherein the 2-chlorobutadiene-(1,3) to be purified is contaminated with up to 5% by weight trans-2-chlorobutene-(2).

References Cited

UNITED STATES PATENTS

| | | | |
|---|---|---|---|
| 3,039,940 | 6/1962 | Prinz | 203—68 X |
| 3,149,172 | 9/1964 | Hughes | 260—655 |
| 3,338,800 | 8/1967 | Binning et al. | 203—70 X |
| 3,354,055 | 11/1967 | Sennewald et al. | |
| 3,354,054 | 11/1967 | Sennewald et al. | 203—8 |

FOREIGN PATENTS 1,292,736  3/1962  France.

NORMAN YUDKOFF, *Primary Examiner.*

F. E. DRUMMOND, *Assistant Examiner.*